M. GARBEL.

TYPEWRITING MACHINE.

APPLICATION FILED AUG. 27, 1920.

Reissued Mar. 14, 1922.

15,305.

2 SHEETS—SHEET 1.

Inventor,
Max Garbel
By Geo. D. Haight
Atty.

M. GARBEL.
TYPEWRITING MACHINE.
APPLICATION FILED AUG. 27, 1920.
Reissued Mar. 14, 1922.
15,305.
2 SHEETS—SHEET 2.
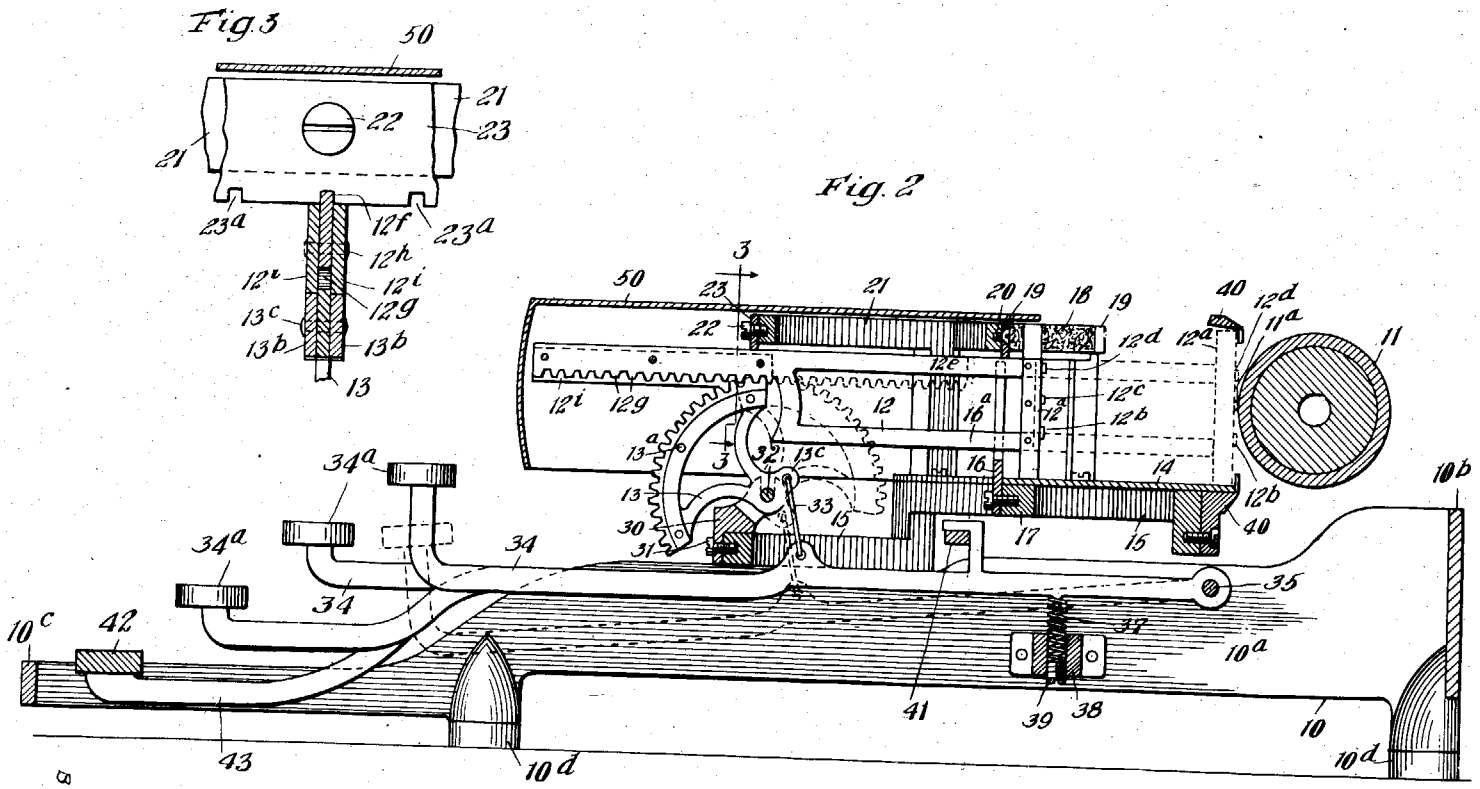
Inventor
Max Garbel
By Geo. T. Wright
His Atty.

UNITED STATES PATENT OFFICE.

MAX GARBEL, OF CHICAGO, ILLINOIS, ASSIGNOR, BY MESNE ASSIGNMENTS, TO GARBELL TYPEWRITER CORPORATION, OF CHICAGO, ILLINOIS, A CORPORATION OF DELAWARE.

TYPEWRITING MACHINE.

15,305. Specification of Reissued Letters Patent. Reissued Mar. 14, 1922.

Original No. 1,305,893, dated June 3, 1919, Serial No. 232,016, filed May 2, 1918. Application for reissue filed August 27, 1920. Serial No. 406,484.

*To all whom it may concern:*

Be it known that I, MAX GARBEL, a citizen of the United States, residing at Chicago, in the county of Cook and State of Illinois, have invented a certain new and useful Improvement in Typewriting Machines, of which the following is a full, clear, concise, and exact description, reference being had to the accompanying drawings, forming a part of this specification.

The invention relates to improvements in a typewriting machine and particularly to an improved form of type bar action for a typewriting machine.

It is the primary object of the invention to provide an improved form of type bar action adapted for use in small writing machines of a compact form commonly called portable machines such machines differ in construction from the standard office machines in that it is desirable that the mechanism be so arranged that the machine will occupy a minimum amount of space when it is desired to carry the same as baggage by travelers, persons engaged in military service and the like.

The invention is applicable to type bar actions in which the type bars reciprocate, as distinguished from actions in which the type bars are pivoted. Heretofore type bars of the reciprocating type have been operated from their corresponding key levers through intermediate levers and link connections or sliding connections. Sliding connections result in a sluggish action due to friction and the difficulty of properly lubricating the slides. Intermediate levers, or sub-levers connected with reciprocating type bars through link or sliding connections have commonly necessitated the use of sub-levers or intermediate levers of considerable length in order to get the necessary degree of throw to properly operate the type bars. This has resulted in a machine of considerable height because of the necessary separation of key levers and type bars to accommodate the intermediate lever mechanism.

It is an object of the invention to provide a segmental gear connection with each of the type bars, the segmental gear being actuated by a suitable connection with the corresponding key levers whereby the maximum degree of throw may be imparted to the type bars from the key levers with a minimum degree of normal separation between type bar and key lever, resulting in a compact machine.

It is a further object of the invention to provide a form of rolling support and guide for the tail end of the type bar, thus making it possible to dispense with the usual lower tail end guides on reciprocating type bar constructions and making it possible to use a much shorter type bar, and still obtain the maximum amount of throw, while at the same time securing a decided advantage not only in compactness but also in ease of operation due to the elimination of unnecessary friction of all sliding connections which are dispensed with in my construction.

Other objects of the invention will appear from the following specification which is directed to the preferred embodiment of my invention as shown in the drawings forming a part of the specification and pointed out more particularly in the appended claims.

In the said drawings Figure 1 is a top plan view showing the arrangement of the parts associated with the type bar action of my machine with parts of the machine main frame and platen broken away.

Figure 2 is a detail sectional view through the machine taken approximately on line 2—2 of Figure 1. In this view parts of the carriage for supporting the platen and for shifting the same are omitted as the same forms no part of the invention.

Figure 3 is a broken detail sectional view illustrating the construction of the type bar action, the view being taken approximately on line 3—3 of Figure 2.

Figure 1:
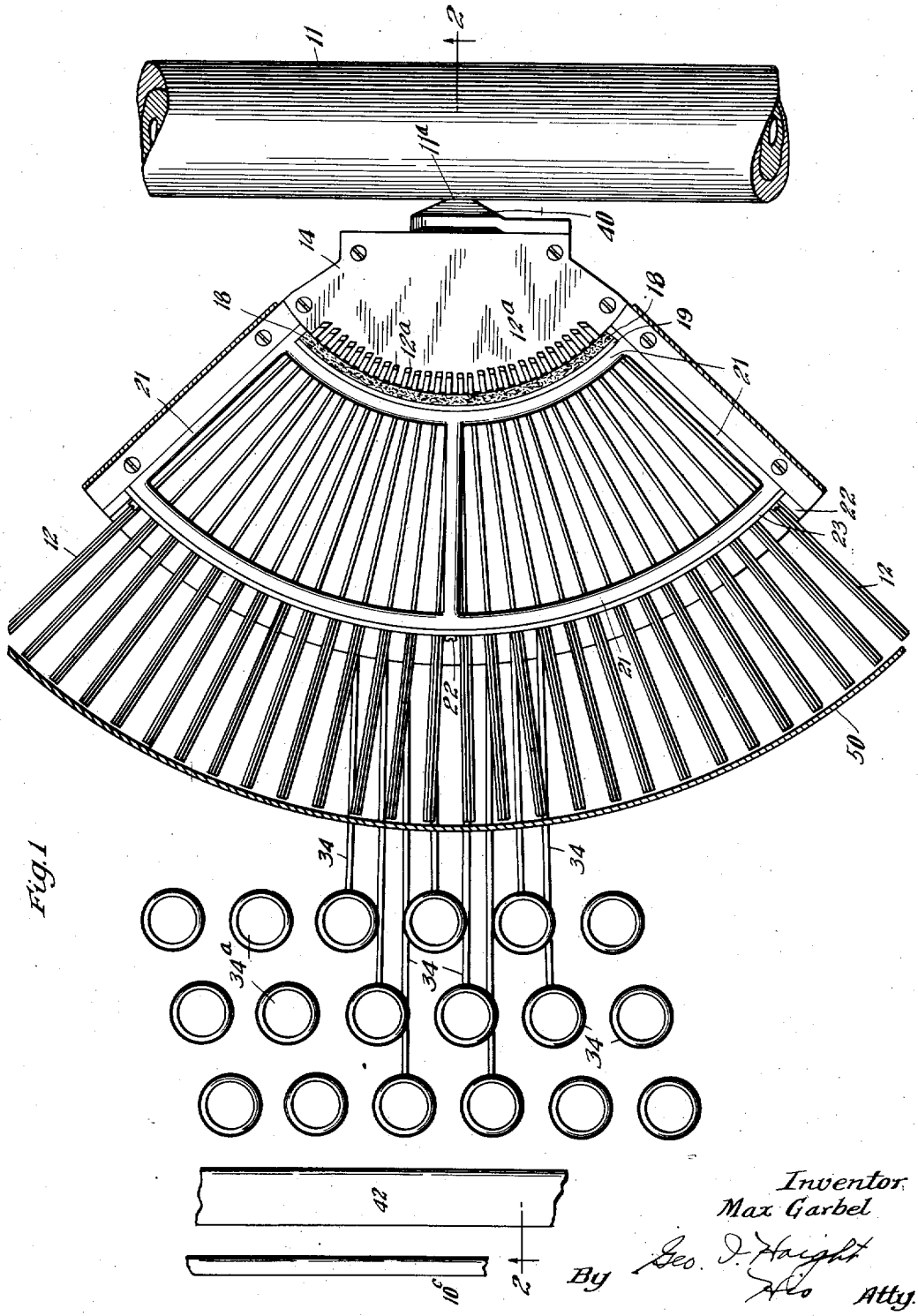

The invention is preferably incorporaed into a construction having a main supporting frame of special and irregular construction as indicated by the reference character 10. This frame is preferably of integral construction and the side portions of the frame are designated by the reference character $10^a$, the back side of the frame at $10^b$ and the front at $10^c$. The frame is provided with four or more downwardly extending projections or legs $10^d$ by which the machine may be supported upon a flat surface as upon a table top. 11 designates generally the platen of the ordinary cylindrical form. It will be understood that the platen will be supported in the ordinary manner upon a carriage of any desired construction mounted upon the main frame 10. No carriage is shown in the drawing as this forms no part of the present invention.

Cooperating with the platen 11 are the printing types $12^a$, the latter being secured to and forming a part of the composite type bars which are designated generally by the reference character 12, and are arranged in a type bar frame on the upper side of the machine above the main frame 10, the arrangement of the type bars being preferably in the form of a segment of a circle with the longitudinal axis of each of the type bars 12 intersecting the printing surface of the platen at the normal printing point which is designated by the reference character $11^a$, (Figures 1 and 2). The composite type bars 12 preferably consist of the type members $12^a$ extending vertically and provided with three printing characters as designated by the reference characters $12^b$, $12^c$ and $12^d$. The type members $12^a$ are each secured to the body portion of the type bar which is designated generally by the reference character $12^e$, Figure 2, and consists preferably of an irregular metal stamping having a main body portion in the general form of a rectangle, the central part of the body portion being cut away for lightness. The body portion $12^e$ of the type bar has an extension from the rectangular portion which is designated in Figure 2 by the reference $12^f$, the latter being in the form of a toothed rack bar, the teeth being designated by the reference character $12^g$. The toothed rack bar portion $12^f$ of the type bar 12 is normally in engagement with a segmental gear or a toothed segmental sub-lever designated generally by the reference character 13, the teeth of the segmental gear being designated at $13^a$. The rack portion $12^f$ of the type bar therefore rests upon the toothed portion of the segmental gear or sub-lever 13 and is carried thereby, while the forward end of the type bar is carried upon the surface of the plate 14 which is supported upon the frame 15 which carries the type bar action. That is to say the lower extremity of the forward end of the type bar has frictional engagement with the top surface of the plate 14 but is guided in its reciprocating movement to and from the printing surface of the platen in order to insure contact at the normal printing point by reason of the fact that the separated body portions $12^e$ and $16^a$ of the type bar are guided in vertical slots in a comb or guide member which is designated generally by the reference character 16 and is secured as indicated by the screws 17 to the type bar action supporting frame 15 (see Figure 2). The slotted comb or guide member 16 is curved in the arc of a circle to conform with the circular arrangement of the type bar actions by which each of the printing faces of the type bars are caused to impinge upon or strike the normal printing point upon the surface of the platen. It should be here noted as will be apparent from an inspection of the top plan view of the type portions of the various type bars $12^a$ as shown in the top plan view of Figure 1 that the printing faces of each of the type are so constructed that the printing face of each type is arranged parallel with the printing face of the platen regardless of the angle at which the type bar and the type thereon moves to engage the platen at the normal printing point. The type members $12^a$ are caused to extend some distance above the upper branch $12^c$ of the type bar in order to form a suitable portion for contact with the cushioning member 18 as shown in both Figures 1 and 2. This cushion may be of felt or other suitable cushioning material and secured to the concavely curved face of the plate 19 secured as indicated by screws 20 to the upper portion 21 of the type bar action frame. Each of the type bar members $12^a$ will therefore normally rest against the cushioning part 18 which will also absorb any tendency to vibration on the part of the type bar action upon the return or retraction of the type bar after contact with the printing face of the platen.

I prefer to extend the lower edge of the plate 19 below the frame 21 as shown in Figure 2, thereby forming an upper retaining ledge for cooperating with the upper surface or edges of the type bars $12^e$ for preventing any tendency on the part of the type bar to rise at the forward or printing end.

At the front side of the curved frame 21 I secure by suitable screws, as indicated at 22 an additional type bar guide plate 23, a portion of which is shown in detail in Figure 3. This guide plate 23 is of special construction being notched as indicated at $23^a$ to receive a cooperating portion at the upper edge of each of the type bars 12. The body portions $12^f$ of the type bars which are provided with the toothed rack portions $12^g$ have attached to them on each side by means of rivets $12^h$ spaced plates $12^i$. The plates $12^i$ are secured to the rack portions $12^f$ of the type bars so that along the upper edge of the type bar about one sixteenth of an inch of the body of the type bar member $12^f$ projects above the upper edges of the side plates $12^i$. This projection of the type bar member $12^f$ is preferably just a trifle more than the depth of the slots or notches $23^a$ in the guide curved member 23 so that the member $12^f$ only engages with the plate and the side members of the type bar clear the guide plate. The plates $12^i$ are preferably allowed to extend a short distance below the lower extremities of the teeth $12^g$ of the rack on the type bar.

The segmental gear 13, having the teeth $13^a$ cooperating with the teeth of the type bar, is also provided with curved side plates $13^b$, one on each side of the segmental gear and secured to the latter by rivets $13^c$. The arrangement of the plates $13^b$ upon the segmental gear or sub-lever 13, together with the plates $12^i$ upon the type bars, it will be seen, is such that these plates are normally in rolling engagement with each other throughout all relative movement of the parts so that there is no tendency for the teeth of the type bar racks to ride up on the teeth of the segmental gear or sub-lever 13, as the weight of the type bars will be carried upon the curved upper surfaces of the plates $13^b$, thus providing a rolling action and minimizing friction and also insuring proper meshing of the teeth of the racks and segmental gears at all times without any tendency for the teeth, by reason of wear or any shifting of relation, to get out of proper mesh. This insures uniformity of cooperation between the parts and easy action at all times throughout the life of the machine since the plates $12^i$ and $13^b$ may obviously be constructed so as to preclude the possibility of any considerable variation in the meshing of the teeth due to wear of the parts. Obviously, each of the longitudinally movable type bars 12 will have a cooperating sub-lever or segmental gear 13 as illustrated in Figures 2 and 3. The segmental gears or sub-levers 13 are arranged in the arc of a circle and supported in the slotted segment frame 30, which is secured by screws 31 to the front curved edge of the type bar action supporting frame 15. The segmental gears or sub-levers 13 are secured on a common curved pivot pin or wire 32 in the segment frame 30. Links 33 connect arms $13^e$ of the sub-levers or segmental gears 13 with key levers 34 which are pivoted at 35 to the main frame 10.

It will be seen that when an operator depresses one of the keys $34^a$ and the corresponding key lever 34 the pull of the link 33 will rock the sub-lever or segmental gear 13 to the position shown in dotted lines in Figure 2, which will result in the longitudinal movement of the type bar 12 to the position of the type bar also shown in dotted lines in Figure 2 where the printing face $12^c$ of the type bar will contact with the printing point $11^a$ on the platen. The key levers 34 are held in their normal or elevated position shown in full lines in Figure 2 by means of suitable compression springs 37 interposed between the levers and the supporting bar 38 shown in section in Figure 2 as attached to the main frame 10. The springs 37 are made adjustable by means of screws and the compression power of the springs may be adjusted to return the type bar and its operating mechanism to the normal or retracted position as shown in full lines in Figure 2 after being operated to the printing position.

A type guide as indicated by the reference character 40, Figures 1 and 2, is preferably employed to properly position the printing types when the type bars are actuated to the printing position. 41 is a universal bar positioned so as to be actuated by the movement of any one of the key levers for the purpose of operating the carriage escapement in the usual manner in machines of this character. 42 is the usual space bar connected through levers 43 with the carriage escapement of the machine in the usual or any desired manner. 50 is a covering plate which may be conveniently arranged as a shield over the top of the machine covering the type bar actions to any extent desired, and at the same time may be utilized for applying the name of the machine thereto or for ornamental purposes.

From the preceding description, considered in connection with the drawing, it will be noted that the location and narrow formation of the rack $12^g$ on the type bar near the top lever thereof permits of the segmental gear 13 being extended upwardly well above the lowermost edge of the type bar 12 while positioned in the same vertical plane. In other words, the type bar and segmental gear may be said to overlap each other in the same vertical plane and by reason of this fact the required height between the point of pivotal support of the segmental gear 13 and the top of the type bar 12 is reduced very materially and is one of the features which contributes to the compactness of the general arrangement. Furthermore, by employing a segmental gear and straight rack engagement for actuating the type bar, I am enabled to obtain a greater horizontal movement of the type bar for a given angular movement of the segmental gear or sub-lever 13 than heretofore obtained in type bar actions employing a reciprocating type bar and bell crank form of sub-lever necessarily having a vertically slidable connection between the bell crank lever and the type bar, where the bell crank lever is of the same effective radius and has the same angular movement as the segmental gear 13 of my invention. This will be better understood when it is considered that with the segmental gear and rack, the type bar travels a distance corresponding to the arc intersected by the angle through which the segmental gear moves whereas with a bell crank or other type of lever type bar actuator, the distance moved by the type bar is only equal to or less than the chord intersected by the arc through which the bell crank lever moves. By reason of this, it will be observed that I am enabled to reduce the required length of the type bar and the space required for its longitudinal movements. The rolling support afforded by the segmental gear eliminates necessity for any stationary support for the outer or rear end of the type bar, a factor also contributing to the shortness of the type bar.

With the improved form of type bar action herein shown, described and claimed I am enabled to construct a machine having the capabilities of standard full sized machines both as to ease of operation and capacity for doing the most difficult work that is obtainable in any of the standard sized machines and at the same time keeping the size of the machine within the limits where it will occupy one third or even less than one third of the space ordinarily occupied by ordinary typewriting machines of standard design.

In order that the invention might be understood the details of the preferred embodiment have been set forth but it is not desired to be limited to the exact details of the type bar action shown for it will be apparent that persons skilled in the art may vary the construction within certain limits without departing from the purpose and spirit of the invention.

I claim:

1. In a type bar action for typewriting machines, the combination with a longitudinally reciprocable type bar provided with a rack consisting of a plurality of teeth consecutively and horizontally arranged along one side of the type bar, a key lever, a pivoted sub-lever provided with a curved toothed segmental portion engaging the teeth of the rack on the type bar, a stationary guide adjacent the toothed portion of the type bar for preventing lateral movement thereof, cooperating means on the sub-lever and type bar adjacent the engaging portions thereof for preventing lateral relative movement between the said sub-lever and type bar, and means for operatively connecting the key lever with the sub-lever.

2. In a type bar action for typewriting machines, the combination with a longitudinally movable type bar provided with a toothed rack portion, a guide plate secured to the toothed rack portion of the type bar adjacent the teeth thereon, a pivoted key lever, a pivoted sub-lever provided with a curved toothed segmental portion engaging the teeth of the rack on the type bar, a curved plate secured to the toothed segmental portion of the pivoted sub-lever adjacent the teeth thereon and being provided with a curved surface adapted to have rolling engagement with the guide plate secured to the toothed rack portion of the type bar, and means for connecting the key lever with the sub-lever for actuating the latter and the type bar upon the movement of the key lever.

3. In a type bar action for typewriting machines, the combination with a longitudinally movable type bar provided with a rack portion, guide plates secured to the type bar on each side of the said toothed portion thereof and substantially inclosing the teeth within the space formed therebetween, a pivoted sub-lever provided with a toothed segmental portion engaging the teeth of the toothed or rack portion of the type bar, curved guide plates secured on opposite sides of the toothed segmental portion of the sub-lever and having curved surfaces adapted to engage the guide plates of the type bar whereby to regulate the meshing of the teeth on the type bar and sub-lever, a key lever, and means for connecting the key lever with the sub-lever for actuating the latter and the type bar under the control of the key lever.

4. In a type bar action for typewriting machines the combination with a longitudinally movable type bar provided with a toothed or rack portion, a pivoted key lever, a pivoted sub-lever provided with a curved toothed segmental portion engaging the teeth of the rack on the type bar, means for connecting the key lever with the sub-lever for actuating the latter and the type bar through the movement of the key lever, and means for determining the meshing of the teeth of the type bar and the teeth of the curved toothed segmental portion of the sub-lever comprising a pair of spaced plates secured adjacent the toothed portion of the type bar and a pair of cooperating curved spaced plates secured adjacent the toothed segmental portions of the sub-lever.

5. In a type bar action for typewriting machines the combination with a longitudinally reciprocable type bar provided with a toothed rack portion at one end and a type bearing portion at the other end, a stationary guide for the bar adjacent the type bearing end, a key lever, a pivoted sub-lever provided with a curved toothed segmental portion in engagement with the under side of the toothed rack portion of the type bar, and cooperating means on the type bar and the toothed segmental portion of the sub-lever whereby to afford a rolling support for the toothed end of the rack bar, and means for operably connecting the key lever with the sub-lever.

6. In a type bar action for typewriting machines the combination with a plurality of longitudinally reciprocable type bars each provided with toothed racks consisting of a plurality of teeth consecutively and horizontally arranged along one side of the type bar, the type bars being arranged radially in a common plane and having suitable guiding devices whereby upon the reciprocation of each of the type bars the printing face thereof will intersect a common printing point, pivoted key levers and pivoted sub-levers corresponding with each of the said type bars, the said sub-levers being each provided with a toothed segmental portion engaging the toothed portion of the type bars, means for connecting each of the key levers with its corresponding sub-lever whereby the actuation of the key lever will move the sub-lever and the type bar, means providing a sliding support for the longitudinally reciprocable type bars near their ends provided with type, and cooperating means on the said toothed segmental portions of the sub-levers and the toothed rack portions of the type bars whereby the toothed ends of the type bars have a rolling engagement with and are carried by the toothed segmental portions of the sub-levers.

7. In a type bar action for typewriting machines, the combination with a reciprocating type bar having a rack extending lengthwise thereof; of a segmental gear cooperable with said rack of the type bar; guiding means for the type bar in its reciprocating movements; means, independent of said guiding means, for maintaining said rack and segmental gear in operative alinement; and means, including a key, for effecting oscillation of said segmental gear.

8. In a type bar action for typewriting machines, the combination with a type bar having a horizontal reciprocating movement, said bar having the main portion of sufficient vertical height to adapt it to carry a plurality of vertically spaced type of different character at one end thereof, said bar having a downwardly faced rack of relatively narrow vertical dimension extending from the opposite end of said main portion near the top level thereof; of a segmental gear cooperable with said rack, said gear being located in the same general vertical plane as that of the type bar and partly extended vertically above the level of the bottom edge of said main portion of the type bar; means for guiding the type bar in its reciprocating movements; and means for effecting oscillation of said segmental gear at will.

9. In a type bar action for typewriting machines, the combination with a type bar having a horizontal reciprocating movement, said bar having the main portion of sufficient vertical height to adapt it to carry a plurality of vertically spaced type of different character at one end thereof, said bar having a downwardly faced rack of relatively narrow vertical dimension extending from the opposite end of said main portion near the top level thereof; of a segmental gear cooperable with said rack, said gear being located in the same general vertical plane as that of the type bar and partly extended vertically above the level of the bottom edge of said main portion of the type bar; means for guiding the type bar in its reciprocating movements; and means for effecting oscillation of said segmental gear at will, said means including a pivoted key lever and connection therefrom to said segmental gear.

10. In a type bar action for typewriting machines, the combination with a type bar having a horizontal reciprocating movement, said bar having the main portion of sufficient vertical height to adapt it to carry a plurality of vertically spaced type of different character at one end thereof, said bar having a downwardly faced rack of relatively narrow vertical dimension extending from the opposite end of said main portion near the top level thereof; of a segmental gear cooperable with said rack, said gear being located in the same general vertical plane as that of the type bar and partly extended vertically above the level of the bottom edge of said main portion of the type bar; means for guiding the type bar in its reciprocating movements; means for effecting oscillation of said segmental gear at will; and means for maintaining said gear and rack in vertical operative alinement.

11. In a type bar action for typewriting machines, the combination with a longitudinally reciprocable type bar provided with a longitudinally extending rack, a key, a pivoted sub-lever provided with a segmental toothed portion cooperable with the teeth of said rack on the type bar, stationary guiding means cooperable with the type bar for preventing lateral movement thereof, cooperating means on said sub-lever and type bar arranged to prevent lateral relative movement between the said sub-lever and type bar, and means for operatively connecting said key with the sub-lever.

12. In a type bar action for typewriting machines, the combination with a plurality of longitudinally reciprocable type bars each provided with longitudinally extending racks, the type bars being arranged radially in a common plane and having suitable guiding devices whereby upon reciprocation of each of the type bars the printing face thereof will intersect a common printing point, finger keys, pivoted sub-levers corresponding with each of the said type bars, each sub-lever being provided with a segmental toothed portion cooperating with the teeth of the corresponding type bar rack, means connecting each of said keys with its corresponding sub-lever whereby the actuating of the key will move the sub-lever and the type bar, means providing a sliding support for the longitudinally reciprocable type bars near their ends provided with type, and cooperating means on the said segmental toothed portions of the sub-levers and the rack portions of the type bars whereby the rack portions of the type bars have a rolling engagement with and are supported by the segmental toothed portions of the sub-levers.

13. In a typewriting machine, the combination with a type bar arranged to reciprocate longitudinally in a straight line, said bar comprising a plate having the main body portion in the general formation of a rectangle adapted to carry the type at one end and provided with an arm of lesser width than that of the rectangle extending longitudinally from the other end thereof substantially in line with the upper side of said rectangle; a pivoted sub-lever comprising a plate disposed in the same plane as that of the plate type bar and having a portion thereof normally in longitudinal alinement with the portion of said end of the rectangular main portion of the type bar below said extended arm; relatively stationary means for guiding the type bar in its reciprocating movements to and from printing position; means, including a key, for effecting oscillation of said sub-lever; and means operable between said sub-lever and said arm for translating oscillating movement of the lever into a reciprocating straight line movement of the type bar.

14. In a typewriting machine, the combination with a type bar arranged to reciprocate longitudinally, said bar comprising a plate having the main body portion in the general formation of a rectangle adapted to carry the type at one end and provided with a relatively narrow arm extending longitudinally from the other end thereof substantially in line with one of the sides of said rectangle; a pivoted sub-lever comprising a plate disposed in the same plane as that of the plate type bar and having a portion thereof normally in longitudinal alinement with said end of the rectangular main portion of the type bar from which said arm is extended; relatively stationary means for guiding the type bar in its reciprocating movements to and from printing position; means, including a key, for effecting oscillation of said sub-lever; means operable between said sub-lever and said arm for translating oscillating movement of the lever into a reciprocating movement of the type bar; and cooperating means on said arm and sub-lever providing a rolling support for said arm during movements of the lever and type bar.

15. In a typewriting machine, the combination with a type bar arranged to reciprocate horizontally in a straight line; of stationary supporting means for the inner type-carrying end of the bar; a pivoted lever cooperatively associated with the outer end of the type bar to effect reciprocation thereof upon oscillation of the lever, said lever supporting said outer end of the type bar at the same horizontal level in all positions of the latter; and means for effecting oscillation of said lever.

16. In a typewriting machine, the combination with a type bar arranged to reciprocate longitudinally in a straight line, said bar comprising a plate having the main body portion in the general formation of a rectangle adapted to carry the type at one end and provided with an arm of lesser width than that of the rectangle extending longitudinally from the other end thereof substantially in line with the upper side of said rectangle; a pivoted sub-lever comprising a plate disposed in the same plane as that of the plate type bar and having a portion thereof normally in longitudinal alinement with the portion of said end of the rectangular main portion of the type bar below said extended arm; relatively stationary means for guiding the type bar in its reciprocating movements to and from printing position; means, including a key, for effecting oscillation of said sub-lever; means operable between said sub-lever and said arm for translating oscillating movements of the lever into a reciprocating straight line movement of the type bar; and means for preventing relative lateral movement between the type bar and sub-lever.

In witness that I claim the foregoing, I have hereunto subscribed my name this 9th day of August, A. D. 1920.

MAX GARBEL.

Witnesses:

SAMUEL JASS,

IRWIN N. WALKER.